(No Model.)

C. W. BARENFANGER.
VEHICLE SPRING.

No. 291,832. Patented Jan. 8, 1884.

WITNESSES
Villette Anderson.
Philip E. Masi.

INVENTOR
C. W. Barenfanger
by Anderson & Smith
his ATTORNEYS

United States Patent Office.

CHRISTIAN W. BARENFANGER, OF EVANSVILLE, INDIANA, ASSIGNOR OF ONE-HALF TO JOHN H. MESKER, OF SAME PLACE.

VEHICLE-SPRING.

SPECIFICATION forming part of Letters Patent No. 291,832, dated January 8, 1884.

Application filed November 8, 1882. (No model.)

*To all whom it may concern:*

Be it known that I, C. W. BARENFANGER, a citizen of the United States, and a resident of Evansville, in the county of Vanderburg and State of Indiana, have invented a new and valuable Improvement in Carriage-Springs; and I do hereby declare that the following is a full, clear, and exact description of the construction and operation of the same, reference being had to the annexed drawings, making a part of this specification, and to the letters and figures of reference marked thereon.

Figure 1:
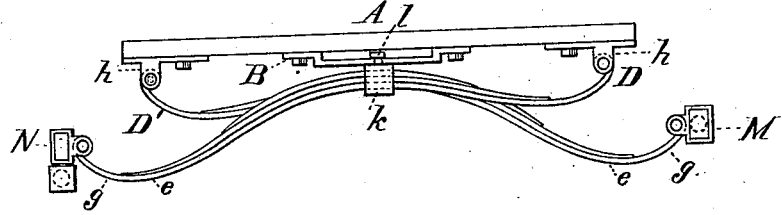
Figure 2:
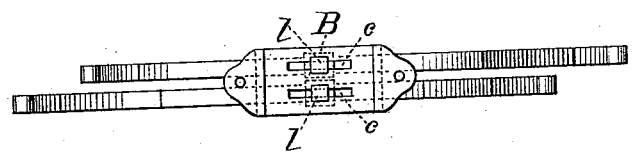
Figure 3:
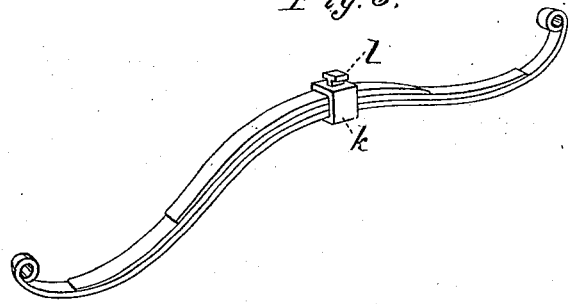

Figure 1 of the drawings is a representation of this invention in a side view. Fig. 2 is a top view of the slotted plate and the springs. Fig. 3 is a perspective detail, showing one of the springs.

This invention has relation to carriage-springs; and it consists in the construction and novel arrangement of parts, as will be hereinafter fully described, and particularly pointed out in the claim appended.

In the accompanying drawings, the letter A designates the side bar of a vehicle, to the middle portion of which is secured a plate, B, having two longitudinal parallel slots or slide-bearings, c.

D and D' represent double-curved springs, which usually consist of several leaves, the lower leaf, e, of each spring having reversely-curved ends g, which are provided with transverse bearings for connecting bolts or pins. The shape of each spring is upwardly convex in its middle portion, and reversely curved or concave at its ends. These springs are designed to act in pairs, one pair constituting one compound spring, and being attached to one side bar. The position of the springs D and D', when attached to the side bar, is oblique, one of the springs, D, being connected to the rear end of the side bar by means of a hanger or shackle, h, and extending forward and downward, while the other spring, D', connected to the front end of the side bar by a similar hanger or shackle, extends rearward and downward. Each spring is provided with a band-connection, k, which is firmly clasped about it eccentrically, being nearer the end which is connected to the side bar than to the lower end of the spring. The band-connection k is provided with a lug or projection, l, which is designed to engage one of the slots c of the plate B of the side bar. In this manner a sliding connection is provided between the side bar and the oblique springs at the bearing-plate B, in order to allow said springs sufficient play at this point to bring into action under the vehicle their elastic force from their upper to their lower ends.

M indicates the rear axle, to which the lower and rear end of the spring D' is connected.

N represents the front bolster, to which the lower and forward end of the spring D is connected.

Instead of attaching the springs to side bars, they may be arranged transversely under the vehicle, being attached to the transverse sills or to suitable portions of the framing.

Having described this invention, what I claim, and desire to secure by Letters Patent, is—

The combination, with the side bar, A, its hangers or shackles h, and slide bearing-plate B, of the pair of double-curved oblique springs D D', having the eccentric band-connections k l, engaging the plate B, and being connected to the shackles or hangers by their opposite upper ends, substantially as specified.

In testimony that I claim the above I have hereunto subscribed my name in the presence of two witnesses.

CHRISTIAN W. BARENFANGER.

Witnesses:
 DOUGLASS ELLIOTT,
 HORACE CONKEY.